United States Patent [19]
Booth et al.

[11] 3,776,378
[45] Dec. 4, 1973

[54] LOG SORTER

[75] Inventors: Bruce F. Booth, Kenogami, Quebec;
Pierre Veilleux, Arvida, Quebec, both of Canada; Richard William Hall, Aberdeen, Wash.

[73] Assignee: Enterprises International, Inc., Hoquiam, Wash.

[22] Filed: May 25, 1972

[21] Appl. No.: 257,008

[52] U.S. Cl. .................... 209/73, 209/85, 198/33 R
[51] Int. Cl. ............................................ B07b 13/04
[58] Field of Search ................... 209/73, 74, 97, 85, 209/98; 198/33 R

[56] References Cited
UNITED STATES PATENTS

| | | | |
|---|---|---|---|
| 3,638,792 | 2/1972 | Bilocq | 209/73 |
| 3,247,963 | 4/1966 | Fenely | 209/90 X |
| 3,545,613 | 12/1970 | Nystuen | 209/97 X |

FOREIGN PATENTS OR APPLICATIONS

| | | | |
|---|---|---|---|
| 1,126,527 | 11/1956 | France | 209/98 |
| 182,836 | 3/1963 | Sweden | 209/97 |

*Primary Examiner*—Allen N. Knowles
*Attorney*—Richard W. Seed et al.

[57] ABSTRACT

A log sorter for sorting logs according to length for delivery of the required length logs to a wood grinding mill or other desired location and the over and under length logs to chippers or other use location comprises a conveyor support table extending along a path of travel of the logs and a flight conveyor extending along the conveyor support table for receiving logs in random fashion and conveying them first to a butt alignment zone wherein the butt ends of the logs are aligned against a common surface and then to a sorting zone wherein the logs are sorted according to length by gravity drop through progressively increasing openings in the conveyor support table.

4 Claims, 3 Drawing Figures

LOG SORTER

BACKGROUND OF THE INVENTION

1. Field of the Invention

This invention relates to an apparatus for sorting logs according to length.

2. Description of the Prior Art

Mechanical pulp grinders require logs of a certain length range for suitable processing. Those logs which are under length or over length have generally been spotted by an operator and manually removed or removed by other means prior to entry of the logs to the input conveyor or conveyors of the wood grinders. The labor cost of sorting logs in this fashion is no longer economical.

To sort logs according to length, it is generally necessary to first commonly align one of the butt ends of the logs against a common alignment surface. Means for butt alignment of logs are known as disclosed in U. S. Pat. No. 2,863,551 and 3,029,923. Means are also known for sorting material according to length, such as disclosed in U. S. Pat. No. 3,467,253.

SUMMARY OF THE INVENTION

This invention is directed to an integrated log sorting apparatus wherein logs are received on a conveying means in random fashion and conveyed by conveyor in spaced relation first to a butt alignment zone and then to a sorting zone. The butt alignment means in the butt alignment zone includes (1) a vertical alignment surface adjacent the conveying means providing a common surface for aligning the butt ends of the logs thereagainst and (2) spaced rollers the axes of which are parallel to the direction of travel of the conveying means and rotatable in the direction of the alignment surface, the rollers each having friction means thereon to grip the logs being conveyed by the conveyor means to move them endwise against the alignment surface. The sorting means in the sorting zone downstream from the butt alignment zone and along the conveying path includes progressively increasing width openings in the conveyor support beneath the conveying means relative to the length of the conveyor beginning at a point adjacent the butt alignment surface, the butt aligned logs dropping through the opening by gravity when the length of the log matches the length of the opening. Power means are provided for driving both the conveyor means and rollers of the butt aligning means.

One of the objects of this invention is to provide a log sorting apparatus comprising in combination (1) means for conveying logs in spaced relation along a path first to a butt alignment zone and then to a sorting zone, (2) means for butt aligning logs in the butt alignment zone, and (3) means for sorting the logs according to length in the sorting zone.

A further object of this invention is to provide a log sorting apparatus wherein the butt alignment means includes spaced rollers the axes of which are parallel to the direction of travel of the conveyor and logs, the roller closely adjacent the butt alignment surface being provided with an external spiral whose lead is in the direction of travel of the conveying means and which travels at a rate greater than the rate of travel of the logs, whereby, when there are two or more logs held between a forward and rear flight of the flight conveyor the screw roll advances the butt end of the first log adjacent the back side of the forward flight to allow the remaining log or logs being pushed by the rear flight to butt align.

DESCRIPTION OF THE PREFERRED EMBODIMENTS

Figure 1:
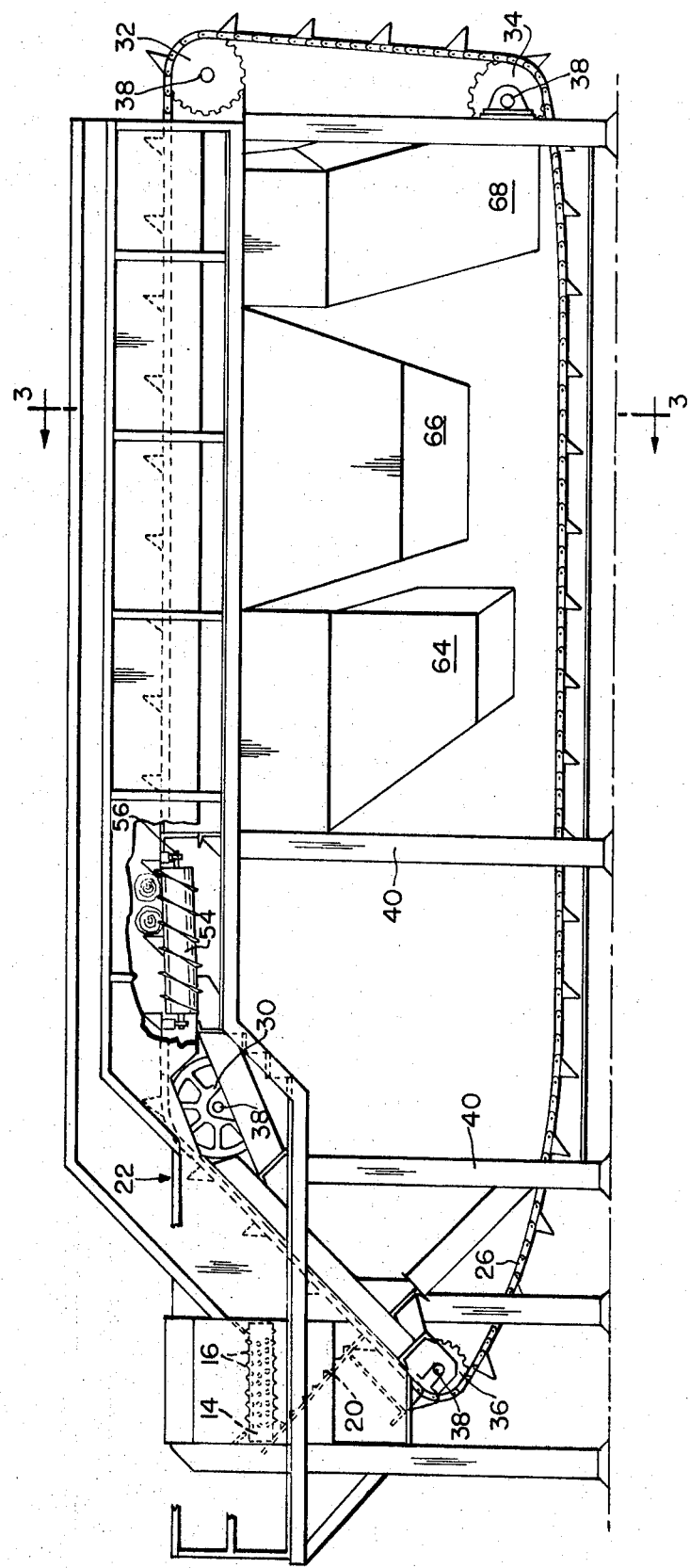
FIG. 1 is a side view of the log sorter of this invention.

The log sorter illustrated in the drawings consists of (1) means for receiving logs randomly and conveying them in regularly spaced arrangement to a butt alignment zone, (2) butt aligning means for butting the logs against a common aligning surface to obtain a common, even end and (3) means for sorting the butt-aligned logs according to length. The log sorter is adapted primarily for sorting lots of from 2 to 36 inches in diameter, and from 5 to 104 inches in length for delivery to chippers, wood grinding mills, or other desired use location.

Figure 2:
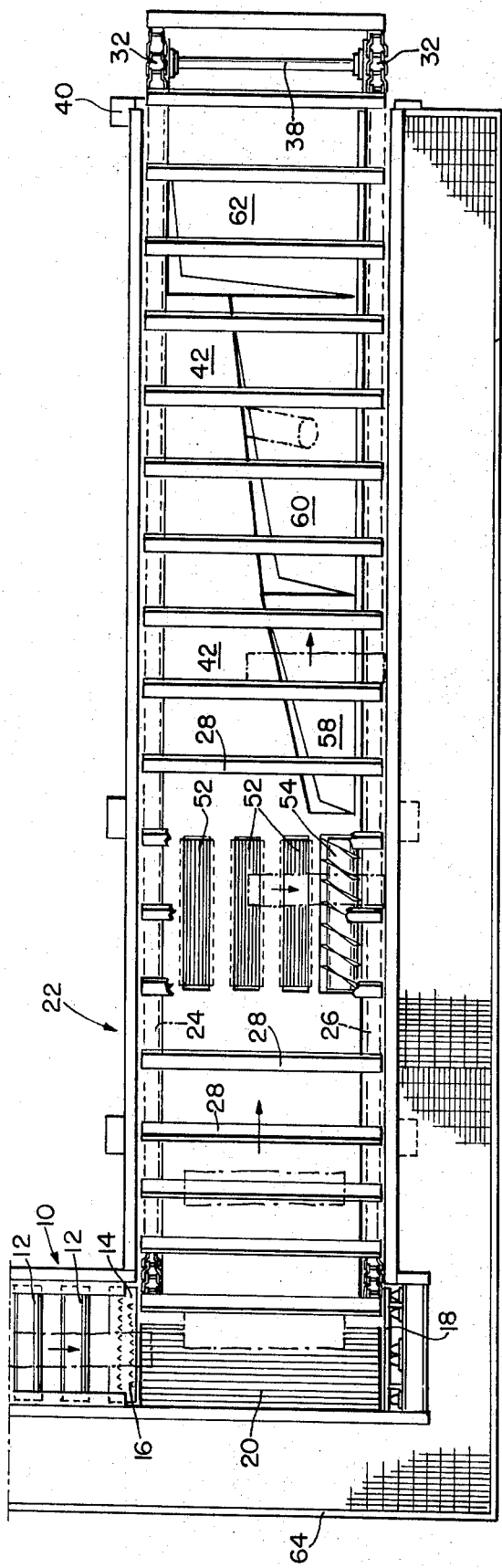
FIG. 2 is a plan view of the log sorter.

Referring to FIGS. 1 and 2, the logs are conveyed endwise to the sorter on an infeed conveyor (not shown) providing an upper substantially horizontal conveying surface. The infeed conveyor may be a single belt, a plurality of belts or a chain conveyor trained about rollers at each end of the conveying surface. Logs leaving the infeed conveyor are received on a speed-up roller conveyor 10 composed of a series of driven rollers 12 designed to align and separate the logs before discharge onto a downwardly inclined log chute leading to an upwardly inclined elevating flight conveyor. One or more of the end rolls 14 of the speed-up roller conveyor 10 may have friction elements 16, such as spikes or ribs to provide positive driving of the logs. The logs leaving the roller conveyor are momentarily airborne before striking the backstop 18 and falling onto a downwardly inclined log chute 20. The log chute aids in guiding the logs in the transverse direction as they are picked up by the elevating flight conveyor 22. The elevating flight conveyor is preferably composed of a plurality of spaced parallel endless chains 24 and 26 with transverse aligned flights 28 secured thereto. The spaced parallel endless chains are trained over driven sprockets 32 and idler sprockets 30, 34 and 36. The flight conveyor is preferably driven by a hydraulic drive capable of harmlessly stalling under overloads to prevent structural damage to the equipment in the event of a jam. Other suitable drive means may be used, however. The drive sprockets and idler sprockets are secured to shafts 38 supported by the frame 40 of the log sorter.

Figure 3:
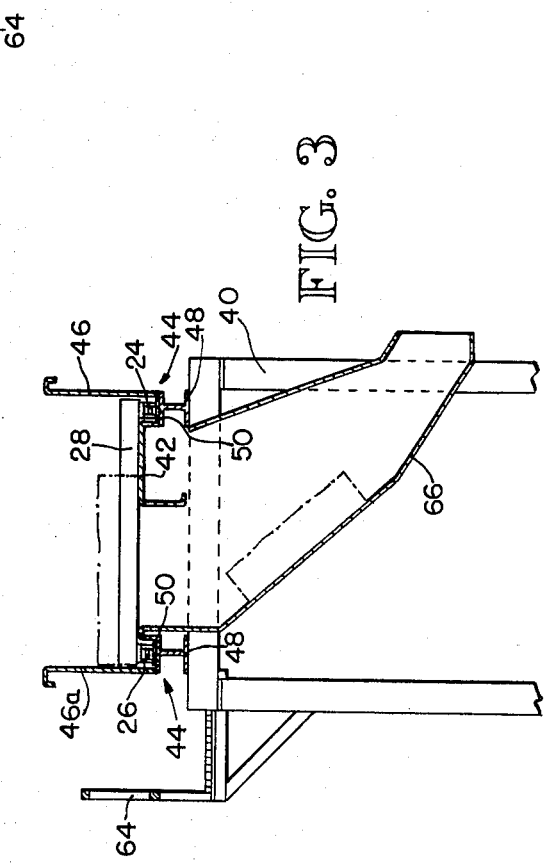
FIG. 3 is a cross-sectional view along section line 3—3 of FIG. 1.

The upper essentially horizontal conveying surface of the flight conveyor first traverses an area wherein the conveyed logs are butt aligned against a vertical alignment surface, and then a sorting area wherein the logs are sorted according to length. Both of these areas will be described in detail later. Referring to FIG. 3, the upper conveying surface consists essentially of a conveyor support table having a bottom wall 42 with recessed channels 44 at each corner and upended side walls 46 and 46a. The table rests on I-beams 48 supported on the upper surface of the frame 40 of the log sorter. The parallel chains 24 and 26 of the flight conveyor are adapted to travel in the channels 44 as illustrated in FIG. 3. Preferably, wear strips 50 of high density polyethylene or other suitable material are placed under the two parallel strands of flight conveyor chain to insure maximum chain life and minimum power requirements.

The butt aligning means is illustrated best by FIG. 2 and comprises a series of butt aligning rollers 52 the axes of which are parallel to the direction of travel of the flight conveyor. All of the rollers except the one closest to the alignment wall 46a, which is a screw-type roller 54, are provided with ribs or spikes or other friction-type elements. The butt aligning rollers are supported by shafts 56 which are supported from the undersurface of the bottom wall 42 of the support table. The butt aligning rollers are driven from a separate power source or preferably from a strand of the flight conveyor chains so that the proper speed relation between the chains and the rollers can be maintained under all operating conditions. The screw-type roller 54 is necessary for butt alignment of logs when there is more than one log per flight of the elevating flight conveyor. The screw-type roll is not necessary if only one log per flight of the flight conveyor is being fed along the conveying path. The lead on the screw-type roller 54 is powered to rotate faster as, for example 10 to 20 per cent faster, than the rate of travel of flight conveyor so that when handling two or more logs per flight the screw will maintain the first log against the forward flight, thus allowing the following log or logs being pushed by the next or rear flight to butt align against the surface 46a. The upper surface of the butt aligning rollers, as shown in FIG. 1, is at about the same level as the bottom wall 42 of the support table and is located in a cutout section of the bottom wall 42.

Downstream from the butt aligning area is the sorting area wherein logs conveyed by the flight conveyor and butt aligned to insure a common even end are sorted according to length. As illustrated by FIG. 2, the sorting area may comprise three sections, each having a progressively increasing opening in the direction of travel of the conveyor in the bottom wall 42 of the conveyor support table. Referring to FIG. 2, each of the three openings 58, 60 and 62 have associated with them respective chutes 64, 66 and 68 which receive the logs dropped through the openings in the conveyor support table for delivery to a desired location. Opening 58 is designed to accept those logs which are underlength for delivery to a chipper. The middle opening 60 accepts those logs having a length acceptable for delivery to a wood grinding mill or other desired use location. The last opening 62 accepts those logs which are too long for acceptance. The logs delivered into the openings 58 and 62 may be delivered to a chipper for chipping into pulpwood chips or other purposes as desired.

A platform 64 suspended by suitable supports is preferably run alongside the alignment wall 46a and infeed conveyor as illustrated in FIG. 2 to allow an operator or operators to visually oversee the log sorting operation.

We claim:

1. Log sorting apparatus for sorting varying lengths of logs comprising:
a conveyor support extending along a path of travel of the logs;
a flight conveyor having transverse flights traveling along the conveyor support for receiving logs in random fashion and conveying them in spaced relation along the path to a butt alignment zone and then to a sorting zone,
butt aligning means in the butt alignment zone to align one end of the logs against a common surface including (1) a vertical alignment surface adjacent the conveying means providing a common surface for aligning the butt ends of the logs thereagainst, and (2) spaced rollers axially disposed essentially transverse to the direction of travel of the conveying means and rotatable in the direction of the butt aligning surface, the roller adjacent the butt aligning surface being a driven screw roller whose lead is in the direction of travel of the flights of the flight conveyor, the screw roller travel-ing at a rate greater than the flight conveyor whereby, when there are two or more logs held between a forward and rear flight of the flight conveyor the screw roller advances the butt end of the first log adjacent the back side of the forward flight to allow the remaining log or logs being pushed by the rear flight to butt align, the remainder of the rollers each having friction means thereon to grip the logs being conveyed by the conveyor means to move them endwise against the align-ment surface,
sorting means in the sorting zone downwstream from the butt alignment zone and along the conveying path including openings in the conveyor support beneath the conveying means of progressively increasing length relative to the width of the conveyor means beginning at a point adjacent the butt alignment surface, the butt aligned logs dropping through the openings when the length of the log matches the length of the opening, and
power means for driving the conveyor means and rollers of the butt aligning means.

2. The sorting apparatus of claim 1 including a series of chutes disposed in side-by-side relation beneath the progressively increasing width openings to accept logs of predetermined range of length dimensions for delivery to a use location.

3. The log sorting apparatus of claim 1 wherein the remaining rollers of the butt aligning means are provided with ribs.

4. Log sorting apparatus for sorting varying lengths of logs comprising:
a conveyor support extending along a conveying path of the logs to be sorted;
a flight conveyor including parallel, spaced apart chains traveling along the conveyor support and path of travel having mounted thereon at spaced intervals flights extending essentially transverse to the direction of travel for con-veying logs to a butt alignment zone and then to a sorting zone;
butt aligning means in the butt alignment zone to align one end of the logs against a common surface, including (1) a vertical alignment surface adjacent the flight conveyor providing a common surface to align the butt ends of the log thereagainst, and (2) spaced rollers the axes of which are parallel to the direction of travel of the flight conveyor and rotatable in the direction of the alignment surface, all of the rollers except the one closely adjacent the alignment surface provided with ribbed surface to grip the logs being conveyed by the flight conveyor and move them endwise against the alignment surface while being conveyed by the flight conveyor, the roller adjacent the alignment surface being a driven screw roller whose lead is in the direction of travel of the flight conveyor and which travels at a rate greater than the flight conveyor, whereby, when two or more logs are held between a forward light and a rear flight of the flight conveyor, the screw roller advances the butt end of the first log adjacent the back side of the forward flight to allow the remaining log or logs being pushed by the rear flight to butt align, sorting means in the sorting zone downstream from the butt alignment zone and along the conveying path including (1) opening of progressively increasing width relative to the length of the conveyor in the conveyor support beneath the progressively increasing width openings to accept logs of predetermined length dimensions for delivery to one location and delivery of the overlength and underlength logs to a chipper or other desired location, and power means driving the flight conveyor and rollers of the butt aligning means.

* * * * *